UNITED STATES PATENT OFFICE.

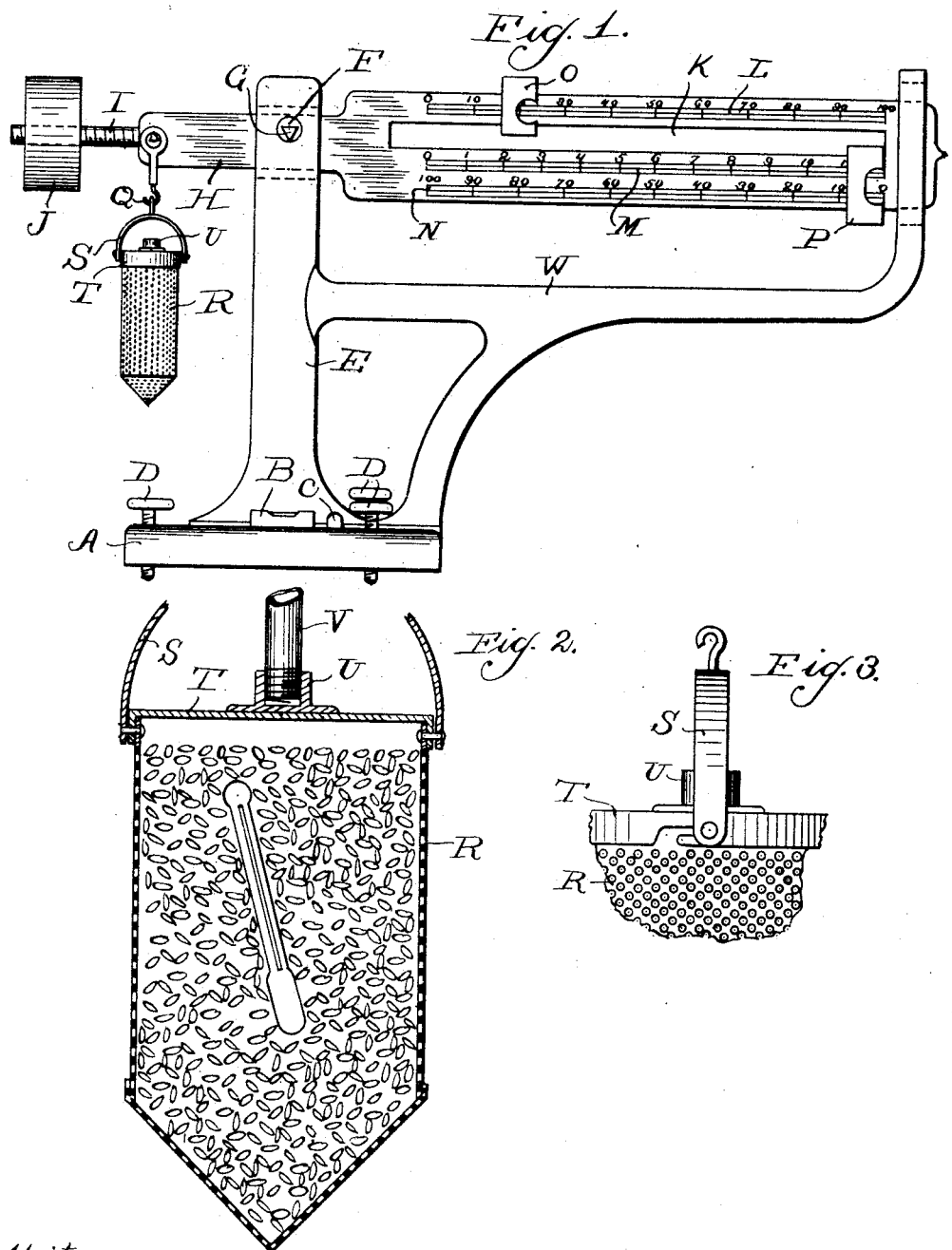

WILLIAM H. PRINZ, OF CHICAGO, ILLINOIS.

TEST-SCALE FOR MALTSTERS.

SPECIFICATION forming part of Letters Patent No. 694,781, dated March 4, 1902.

Application filed July 12, 1901. Serial No. 68,022. (No model.)

*To all whom it may concern:*

Be it known that I, WILLIAM H. PRINZ, a citizen of the United States, residing at Chicago, in the county of Cook and State of Illinois, have invented certain new and useful Improvements in Test-Scales for Maltsters; and I do hereby declare the following to be a full, clear, and exact description of the invention, such as will enable others skilled in the art to which it appertains to make and use the same.

My invention relates to a novel construction in a test-scale for maltsters, the object being to provide a scale by means of which the maltster is enabled to determine when his grain has been sufficiently steeped and to determine the subsequent loss in weight sustained in the malting process; and it consists in the features of construction and combinations of parts hereinafter fully described and claimed.

In the accompanying drawings, illustrating my invention, Figure 1 is a side elevation of the test-scale constructed in accordance with my invention. Fig. 2 is a central longitudinal section, on an enlarged scale, of the grain-receptacle forming part of my scale. Fig. 3 is a fragmentary detail side elevation showing the manner of securing the cover on said receptacle.

My said scale consists of a base A, carrying spirit-levels B and C and resting on set-screws D, by means of which it may be leveled. Mounted on said base A is a standard E, bifurcated at its upper end and provided with openings F in said bifurcated portion to receive the knife-edge pivots G of the scale-beam H. The latter is provided at one end with a threaded shank I, adapted to receive a tapped weight J and at its other end is enlarged and provided with a longitudinal slot K. Above said slot K and between the ends thereof said scale-beam H is provided with a graduated scale L, indicating percentage and reading from "0" to "100," beginning at the point nearest the pivot. Immediately below said slot and occupying the same position relatively thereto is a graduated scale M, indicating ounces, marked "0" to "12" and reading in the same direction as said graduated scale L. Below said graduated scale M is another graduated scale N, also indicating percentage, but reading in the opposite direction from the scales L and M. A weight O is movable on said scale-beam above the slot K, and a weight P is movable in said slot, both said weights indicating on the graduated scales with the edges farthest from the pivot. On the other end of said scale-beam a hook Q is hung, which is adapted to receive and support a perforated receptacle R, adapted to contain the grain to be weighed and tested. The said receptacle R is provided with a bail S, pivotally mounted thereon and with a flanged cover T, the flange of which is provided with L-shaped recesses adapted to receive the pivots of the bail and to be held in place thereby. Said cover is also provided with an internally-threaded nipple U, adapted to receive the threaded end of a hollow handle V, by means of which said receptacle may be hung in a steep-tank or inserted in the body of grain being malted. I provide an arm W in said base, having an upwardly-extending slotted portion adapted to receive the outermost end of the graduated portion of scale-beam H and limit the motion thereof in both directions in the usual manner.

After leveling the scale the receptacle R, after receiving a thermometer, is hung on the hook Q, the weights O and P are moved until they stand at "0" on the graduated scales L and M, and the weight J adjusted until the scale-beam H balances. The weight P is then moved to indicate "12" on the graduated scale M and grain is then introduced into said receptacle R until the scale-beam again balances. The receptacle R is then removed, the handle V secured thereto, and said receptacle is then inserted in the water in a steep-tank together with the body of grain to be malted.

The maltster determines from examination of his grain the amount of moisture it must absorb in the steeping process, and by removing and weighing the receptacle R and its contents at intervals he can readily determine when the desired percentage of moisture has been absorbed. To effect this, the handle V is removed, the receptacle is again hung on the hook Q, and the weight O moved up on the graduated scale L until the scale-beam H again balances, the weight P remaining in the position shown in Fig. 1. When said scale-beam balances, said weight O will obviously indicate the percentage of gain in weight, and hence the amount of moisture absorbed by the grain. After attaining the desired percentage of moisture the grain is transported to the malting-floor, where germination takes place. During germination the grain loses weight by losing moisture and by the liberation of gases during this process, and by frequently weighing the grain in the said receptacle (which remains inserted in the body of grain during the germination) the maltster can readily determine the rapidity and principal periods of loss in weight. As such weight is lost the weight O is moved gradually back until it again indicates "0" on the graduated scale L, and thereafter any further loss in weight is indicated by the weight P, which is gradually moved toward "0" on the graduated scale M and simultaneously toward "100" on the graduated scale N, thus indicating in ounces and percentage the loss from the original weight.

I claim as my invention—

1. In a test-scale, the combination with a base and a standard, of a scale-beam fulcrumed between its ends on said standard, one end of said scale-beam being provided with two graduated scales indicating percentage and reading in opposite direction, and with a graduated scale indicating ounces, a weight movable over and indicating on one of said percentage-scales, a second weight movable over and indicating simultaneously on both the other graduated scales, an adjustable counterweight on the other end of said scale-beam, and a removable perforated receptacle on said other end forming a load-receiver, substantially as and for the purpose described.

2. In a test-scale, the combination with a base, a standard thereon, and devices for leveling said base, of a scale-beam fulcrumed between its ends on said standard, a longitudinal slot in one end of said scale-beam, a graduated scale on said scale-beam above said slot indicating percentage, a similar graduated scale below said slot reading in the opposite direction, a graduated scale below said slot indicating ounces, a weight movable over and indicating on said first-named graduated scale, a second weight movable in said slot and embracing the lower bar of said scale-beam and indicating simultaneously on both said last-named graduated scales, an adjustable counterweight on the other end of said scale-beam, a removable perforated receptacle on said last-named end adapted to receive the substance to be weighed, and coacting with said counterweight to balance said scale-beam, substantially as and for the purpose described.

In testimony whereof I affix my signature in presence of two witnesses.

WILLIAM H. PRINZ.

Witnesses:
RUDOLPH WM. LOTZ,
JOHN SNOWHOOK.